United States Patent
Vandegrift

(10) Patent No.: US 12,010,958 B2
(45) Date of Patent: Jun. 18, 2024

(54) HIGH FLOW VENTURI NOZZLE, SYSTEM, METHOD OF MANUFACTURE AND METHOD OF USE

(71) Applicant: Gideon Vandegrift, Sarasota, FL (US)

(72) Inventor: Gideon Vandegrift, Sarasota, FL (US)

(73) Assignee: Gideon Vandegrift, Sarasota, FL (US)

( * ) Notice: Subject to any disclaimer, the term of this patent is extended or adjusted under 35 U.S.C. 154(b) by 0 days.

(21) Appl. No.: 17/585,541

(22) Filed: Jan. 26, 2022

(65) Prior Publication Data

US 2022/0354075 A1 Nov. 10, 2022

Related U.S. Application Data

(63) Continuation-in-part of application No. 17/308,742, filed on May 5, 2021.

(51) Int. Cl.
*A01G 31/02* (2006.01)
*A01G 7/06* (2006.01)
*C02F 1/467* (2023.01)

(52) U.S. Cl.
CPC .............. *A01G 31/02* (2013.01); *A01G 7/06* (2013.01); *C02F 1/4676* (2013.01)

(58) Field of Classification Search
CPC ......... A01G 31/02; A01G 7/06; C02F 1/4676; Y02W 10/10; B01F 25/31232; B01F 25/31242; B01F 35/56; B01F 23/232
See application file for complete search history.

(56) References Cited

U.S. PATENT DOCUMENTS

| | | | |
|---|---|---|---|
| 2,760,371 A | 8/1956 | Borden | |
| 2,797,904 A | 7/1957 | Voorheis | |
| 4,123,800 A | 10/1978 | Mazzei | |
| 4,966,001 A | 10/1990 | Beebe | |
| 7,854,637 B2 | 12/2010 | Schultz | |
| 2003/0178732 A1 | 9/2003 | Luman | |
| 2010/0252652 A1 | 10/2010 | Johnson et al. | |
| 2011/0083439 A1 | 4/2011 | Zuo et al. | |
| 2018/0043319 A1 | 2/2018 | Schneider et al. | |
| 2018/0058388 A1 | 3/2018 | Zhang | |
| 2018/0274164 A1* | 9/2018 | Kim ................. | B01F 23/23412 |
| 2020/0206700 A1 | 7/2020 | Seal et al. | |

FOREIGN PATENT DOCUMENTS

| | | |
|---|---|---|
| CN | 202492409 U | 8/2011 |
| CN | 203869853 U | 5/2014 |
| EP | 2216599 A2 | 8/2010 |
| GB | 2439380 A | 12/2007 |

OTHER PUBLICATIONS

International Search Report and Written Opinion issued in PCT/US2022/028661, dated Jan. 18, 2023, 21 pages.

* cited by examiner

*Primary Examiner* — Rick K Chang
(74) *Attorney, Agent, or Firm* — Dinsmore & Shohl LLP

(57) ABSTRACT

The present invention is directed to a High Flow Venturi Nozzle assembly capable of diffusing gas into a large quantity of fast-moving liquid. The High Flow Venturi Nozzle has female and male caps which form a pocket when the caps are joined together, and which pocket is in fluid communication with an orifice in the male cap.

8 Claims, 13 Drawing Sheets

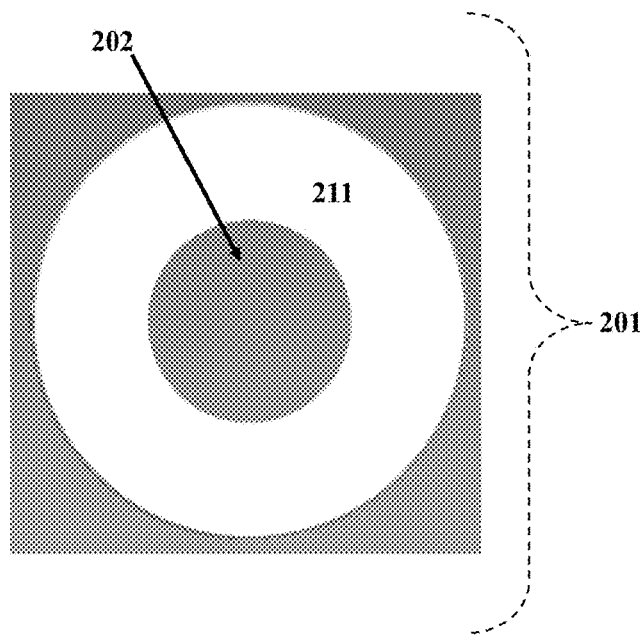
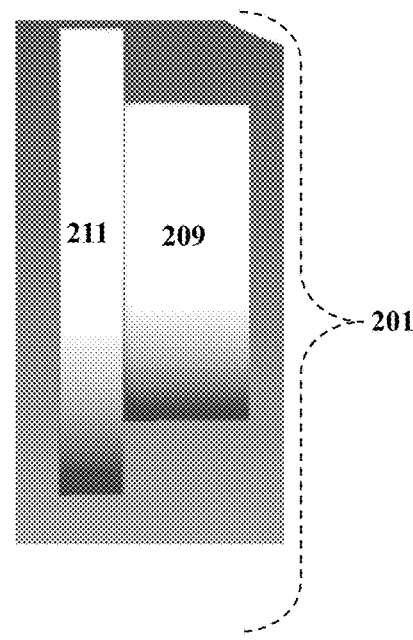
Figure 6B    Figure 6C
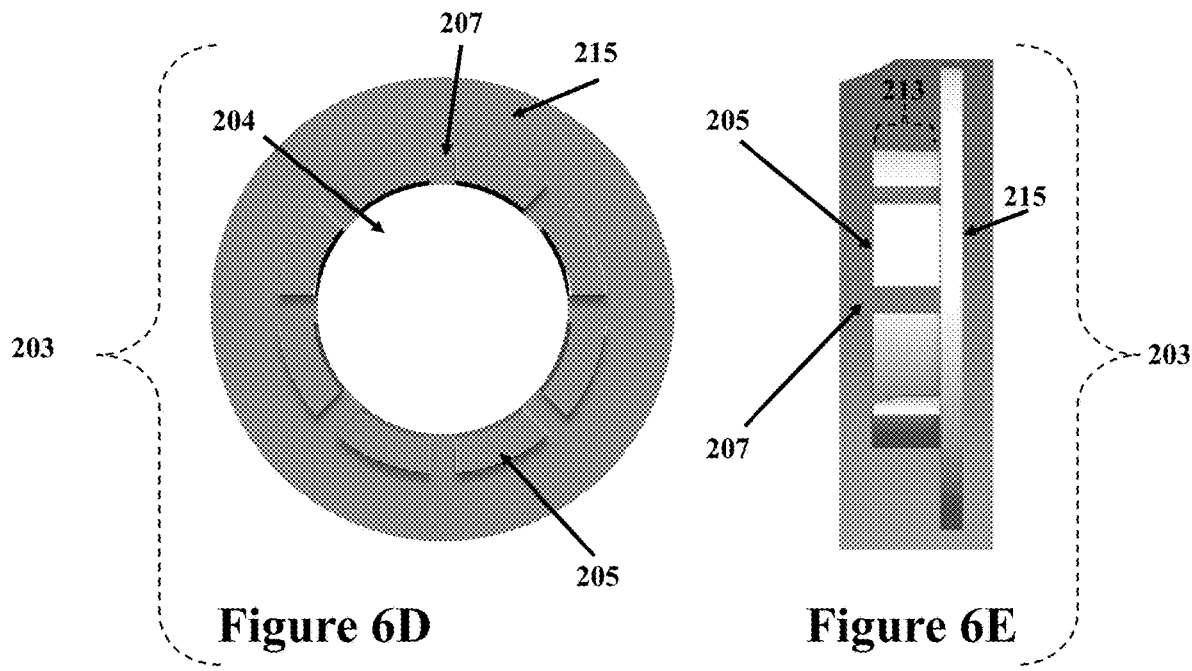
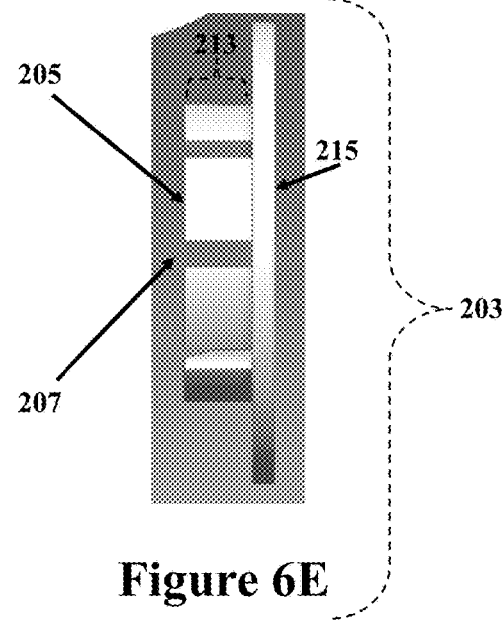
Figure 6D    Figure 6E

HIGH FLOW VENTURI NOZZLE, SYSTEM, METHOD OF MANUFACTURE AND METHOD OF USE

CROSS-REFERENCE TO RELATED APPLICATIONS

This application is a continuation-in-part of U.S. patent application Ser. No. 17/308,742 filed on May 5, 2021 (pending) entitled "Multiple-Venturi Nozzle, System, Method of Manufacture and Method of Use." The entire disclosure of that application is hereby incorporated herein by reference.

BACKGROUND OF THE INVENTION

First discovered by the Italian physicist Giovanni Battista Venturi in 1797, the "Venturi effect" is the name for a natural phenomenon that sees a reduction in fluid pressure when a fluid flows through a constricted section (or choke) of a pipes. In an idealize state, an incompressible fluid's: (a) velocity must increase as it passes through a constriction under the principle of mass continuity; and (b) static pressure must decrease as it passes through a constriction under the principle of conservation of mechanical energy (i.e., Bernoulli's principle). Put another way, any "gain" in kinetic energy a fluid attains by its increased velocity through a constriction is balanced by a "drop" in pressure.

As noted above, this application is a continuation-in-part of U.S. patent application Ser. No. 17/308,742 (the "Parent Application"). In the Parent Application, a novel multiple-venturi nozzle was disclosed (along with a system, method of manufacture and method of using same). This multiple-venturi nozzle was designed to create a high degree of gas diffusion into a liquid while maintaining a relatively low flow rate: perfect for applications such as oxygenating water in hydroponic applications where high dissolved oxygen and low flow rate are ideal conditions.

SUMMARY OF THE INVENTION

The primary object of the present invention is directed to a High Flow Venturi Nozzle ("HFVN") apparatus capable of diffusing gas into a large quantity of fast-moving liquid. For example, in many water-treatment and aquacultural applications, it is necessary to diffuse air (or other gasses) into a fast-moving stream of water. As noted above, Traditional Venturi Nozzles generally are unable to do this; however, the present invention is capable of accommodating a high flow rate while still accomplishing the task of diffusing gas into the high-flow liquid.

Another object of the present invention is an embodiment of the HFVN generally comprising: (a) a body having at least one choke extending through said body; (b) a manifold (to which an outside gas supply can be connected); (c) at least one manifold outlet connected to each choke; and (d) an internal "path" system connecting the manifold to each manifold outlet (and, thus, to each choke). In this way, when a gas is connected to the manifold (e.g., by connecting a gas supply to the manifold via a tube and using a manifold nipple), the gas will flow from the manifold, through the internal "path" system and out into the choke through the manifold outlets. Thus, when a fluid (especially a fluid which is flowing quickly) is passed through the chokes, a venturi effect will occur at each manifold outlet.

Another object of the present invention is an HFVN Assembly generally comprising: (a) a female cap; and a (b) male cap; which is designed to be inserted into a pipe with a tee having a tee opening (commonly known as a "reducing tee"). The female cap has a body and a protruding flange. The female cap also has a centrally located hole which extends throughout both the body and the flange. The male cap likewise has a body, a protruding flange and a centrally located hole which extends throughout both the body and the flange. However, the male body further comprises at least one (preferably a plurality) of fins and manifold outlets. When the male and female caps are joined together inside a pipe: (i) they define a pocket of space whereby the tee opening is in fluid communion with the manifold outlets; and (ii) they form a type of "choke" since the female cap opening and the male cap opening align to form one continuing opening. This allows water (or some other liquid) to flow through the pipe—creating a venturi effect at the manifold outlets. When the tee is connected to a gas source (e.g., air), such gas will be drawn into the pocket and through the manifold outlets where it will be diffused into the water (or other liquid).

Another object of the present invention is an HFVN Assembly wherein the manifold outlets further comprise a plurality of pinhole manifold outlets.

BRIEF DESCRIPTION OF THE DRAWINGS

FIG. 6B is a front view of a female cap portion of an HFVN assembly.

FIG. 6C is a side vide of a female cap portion of an HFVN assembly.

FIG. 6D is a rear view of a male cap portion of an HFVN assembly.

FIG. 6E is a side vide of a male cap portion of an HFVN assembly.

REFERENCE NUMERAL CHART

Figure 1:
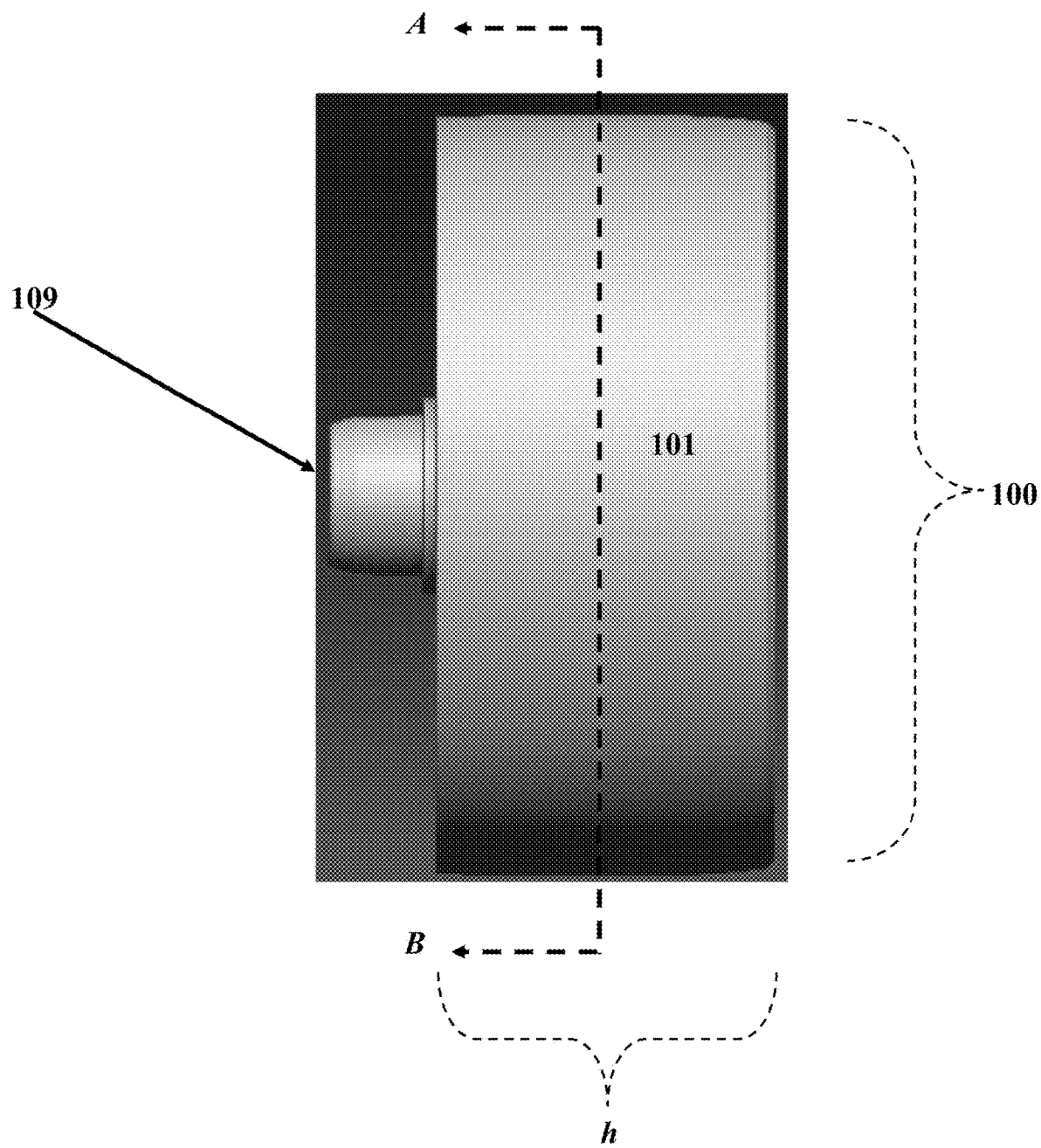
FIG. 1 is a side view of an HFVN having a height h showing a plane $\overline{AB}$ through the body of the HFVN.

For purposes of describing the preferred embodiment, the terminology used in reference to the number components in the drawings is as follows:

| | |
|---|---|
| 100 | High Flow Venturi Nozzle ("HFVN") |
| 100a | High Flow Venturi Nozzle ("HFVN") Segment |
| $h_s$ | Segment Height |
| 101 | Body |
| 102 | Top Surface |
| 103 | Choke |
| 105 | Choke Inlet |
| 107 | Choke Outlet |
| 109 | Manifold |
| 111 | Manifold Nipple |
| 113 | Manifold Inlets |
| 115 | Manifold Channel |
| 117 | Manifold Outlet |
| 119 | Manifold Passage |
| 121 | Bottom Surface |
| H | Height |
| 200 | HFVN Assembly |
| 201 | Female Cap |
| 201a | Female Cap Pitch |
| 202 | Female Cap Opening |
| 203 | Male Cap |
| 204 | Male Cap Opening |
| 205 | Fins |
| 205a | Fin Pitch |
| 205b | Small Fins |
| 205c | Large Fins |
| 207 | Manifold Outlets |
| 209 | Female Body |
| 211 | Female Flange |
| 213 | Male Body |
| 215 | Male Flange |
| 216 | Pocket |
| 217 | Pipe |
| 219 | Tee |
| 221 | Tee Opening |
| 223 | Pinhole Manifold Outlets |
| 300 | Two-Piece HFVN |
| 301 | Top Piece |
| 302 | Top Surface |
| 303 | Bottom Piece |
| 304 | Bottom Surface |
| 305 | Manifold |
| 307 | Manifold Nipple |
| 309 | Top Chamber |
| 311 | Bottom Chamber |
| 313a | Top Choke |
| 313b | Bottom Choke |
| 315 | Manifold Outlet |

DETAILED DESCRIPTION OF THE INVENTION

FIG. 1 is a side view of an HFVN 100 having a Body 101 and a height h. The HFVN 100 shown in FIG. 1 includes a centrally located Manifold 109. FIG. 1 further depicts a plane $\overline{AB}$ through the Body 101 of the HFVN 100 and parallel to the Manifold 109.

Figure 2:
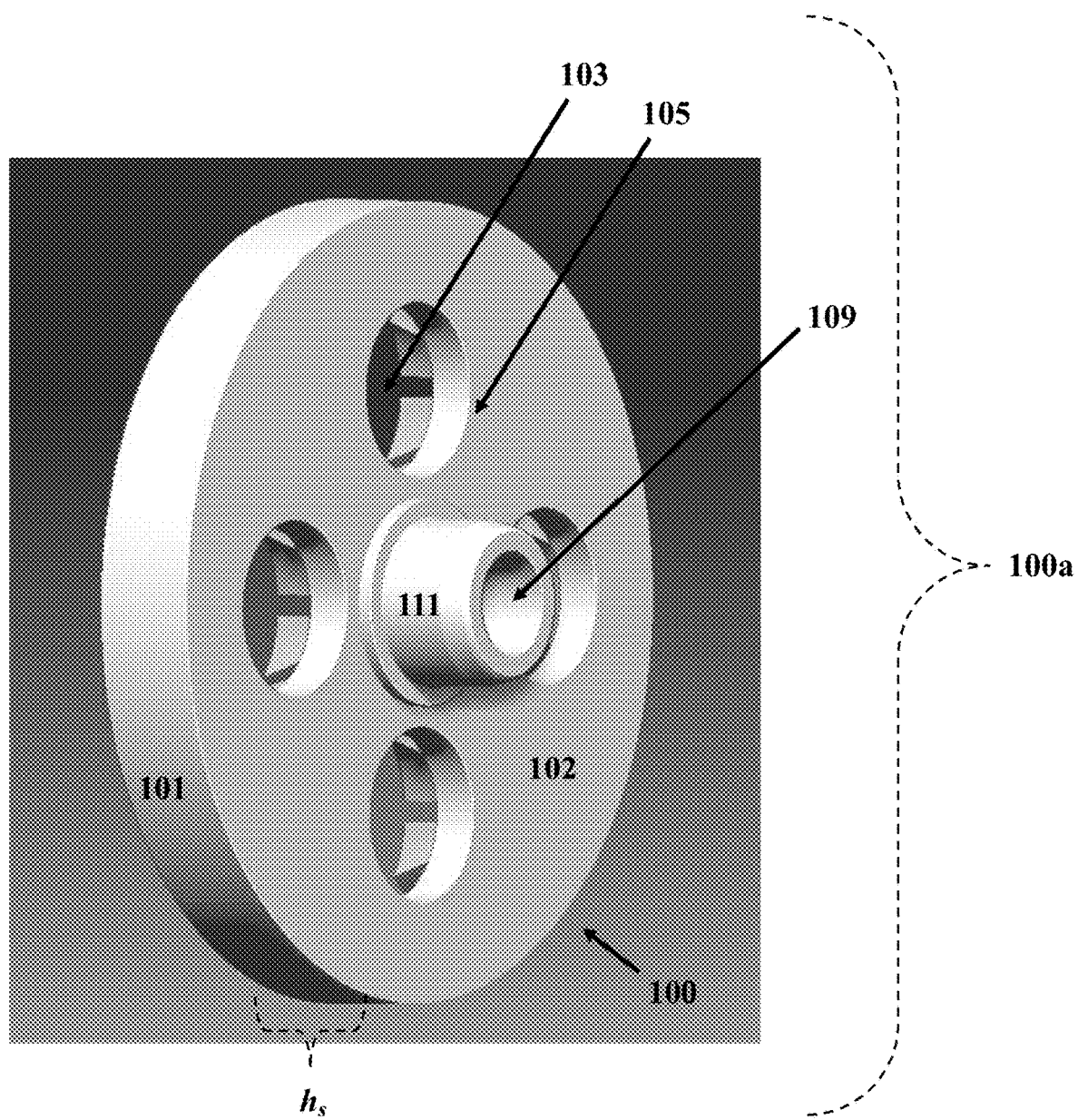
FIG. 2 is a front perspective view of an HFVN segment (taken along plane $\overline{AB}$ from FIG. 1) having a height $h_s$ and having a plurality of chokes and a single manifold.

FIG. 2 is a front perspective view of an HFVN Segment 100a (taken along plane $\overline{AB}$ from FIG. 1) having a height $h_s$.

The HFVN 100 has at least one Manifold 109. In the embodiment shown in FIG. 2, the HFVN 100 includes a single Manifold 109 which is centrally located in the HFVN 100. The HFVN 100 further comprises a plurality of Chokes 103; each of which has a Choke Inlet 105 and a Choke Outlet 107 (not shown in FIG. 2) and extends from a Top Surface 102 of the HFVN 100 to a Bottom Surface 121 (not shown in FIG. 2) of the HFVN 100. In the embodiment shown in FIG. 2, the HFVN 100 includes four Chokes 103 which are equidistantly distributed in a radial pattern about the Manifold 109. A Manifold Nipple 111 extends outwardly from the Top Surface 102 of the HFVN 100. This manifold Nipple 111 may be dimensionally sized to accommodate a variety of hoses/tubing which, in turn, can be connected to a gas supply such as an air supply or an oxygen supply.

Figure 3A:
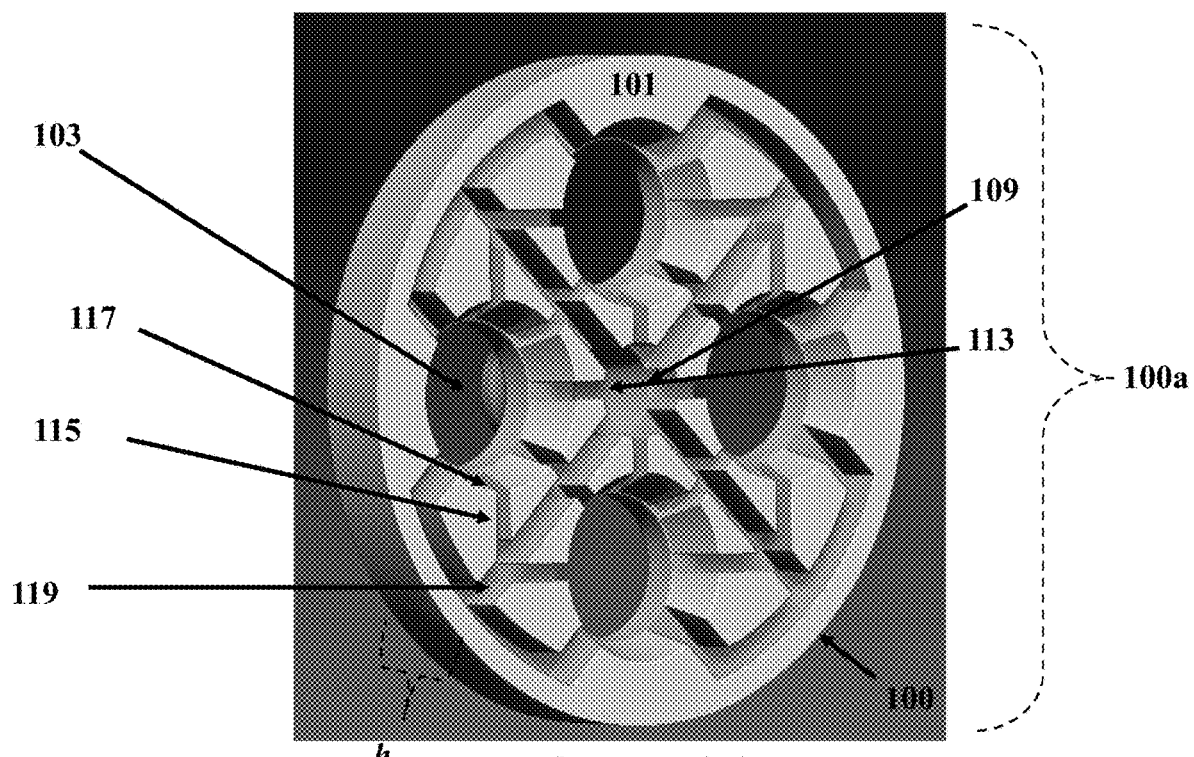
FIG. 3A is a rear perspective view of an HFVN segment (taken along plane $\overline{AB}$ from FIG. 1) showing the interior structure of the HFVN.

FIG. 3A is a rear perspective view of an HFVN segment 100a (taken along plane $\overline{AB}$ from FIG. 1) showing the interior structure of the HFVN 100. Each Choke 103 has a connection to the Manifold 109. In the embodiment shown in FIG. 3A, such connection is accomplished by having the Manifold 109 in fluid connection with a Manifold Inlet 113 which, in turn, is in fluid connection with a plurality of Manifold Passages 119. Each Manifold Passage 119 is connected to at least one Manifold Channel 115. Each Manifold Channel 115 is connected to one of the Chokes 103. Thus, gas being passed through the Manifold 109 is able to travel through the Manifold 109, into the Manifold Inlet 113, through a manifold passage 119 down a manifold channel 115 come on and out into the choke 103 through a manifold outlet 117. Thus, there is a continuous fluid connection between the manifold 109 and each of the chokes 103. In this way, a gas may be connected to the Manifold 109 and diffused into a liquid (not shown) which is passing through the Chokes 103. When the Manifold 109 is connected to a gas supply (e.g., air), the small opening of the Manifold Outlets 117 creates a venturi effect as liquid (e.g., water) flows through the Chokes 103. Given the relatively large diameter of the Chokes 103, a high liquid flow rate can be achieved through the Chokes 103 while, thus, still diffusing gas into the liquid by means of the venturi effect generated at the Manifold Outlets 117 inside the Chokes 103. For example, if the HFVN 100 is placed inside a pipe (not shown in FIG. 3A), water or another liquid could flow through the pipe and through the HFVN 100.

Figure 3B:
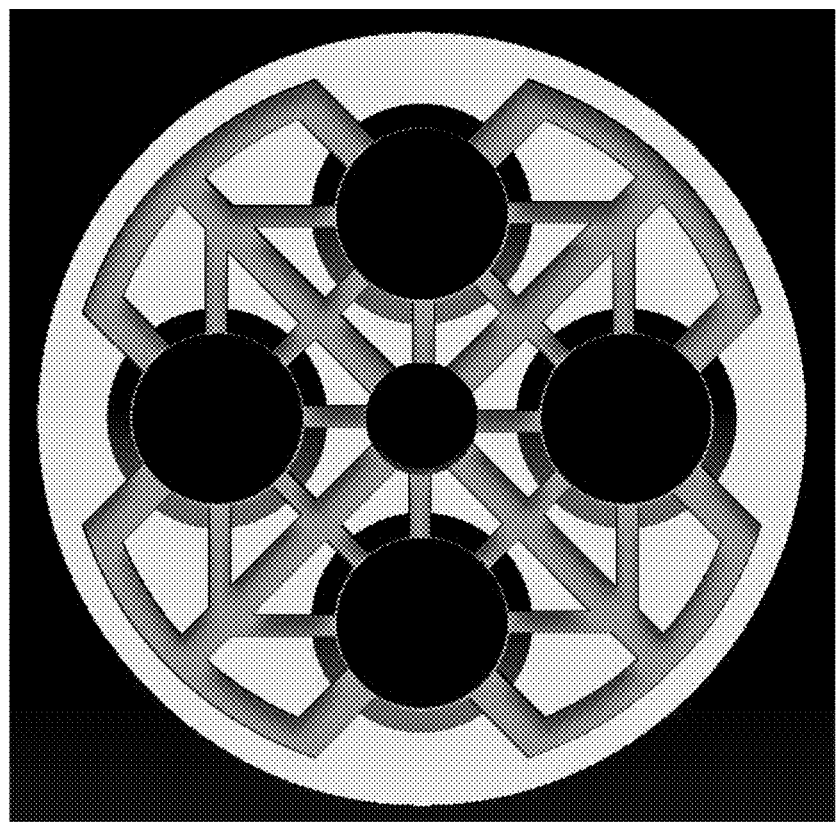
FIG. 3B is a rear view of an HFVN segment (taken along plane $\overline{AB}$ from FIG. 1) showing the interior structure of the HFVN.

FIG. 3B is a rear view of an HFVN segment 100a (taken along plane $\overline{AB}$ from FIG. 1) showing the interior structure of the HFVN 100. This figure is included to more clearly show the fluid collections between the Manifold 109, Manifold Inlet 113, Manifold Passages 119, Manifold Channels 115, Manifold Outlets 117 and Chokes 103.

Figure 4A:
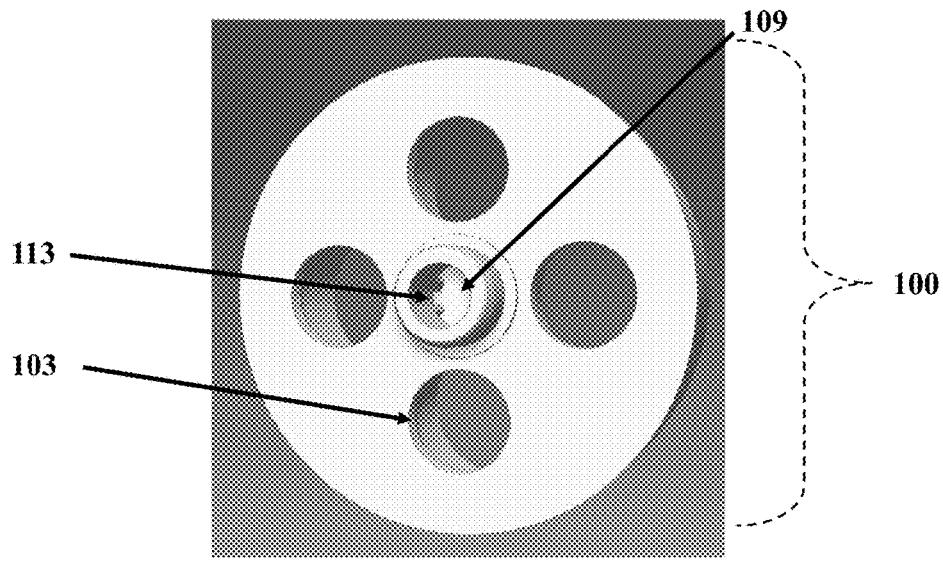
FIG. 4A is a front perspective view of an HFVN having a plurality of chokes and a single manifold.

FIG. 4A is a front perspective view of an HFVN 100 having a plurality of Chokes 103 and a single Manifold 109. As can be seen in FIG. 4A, the plurality of Manifold Inlets 113 inside the Manifold 109 has the appearance of "grooves" or "fins." As discussed earlier herein, each of these Manifold Inlets 113 is fluidly connected to one of the Chokes 103. This allows air or another gas to pass through the Manifold 109 and into the Chokes 103.

Figure 4B:
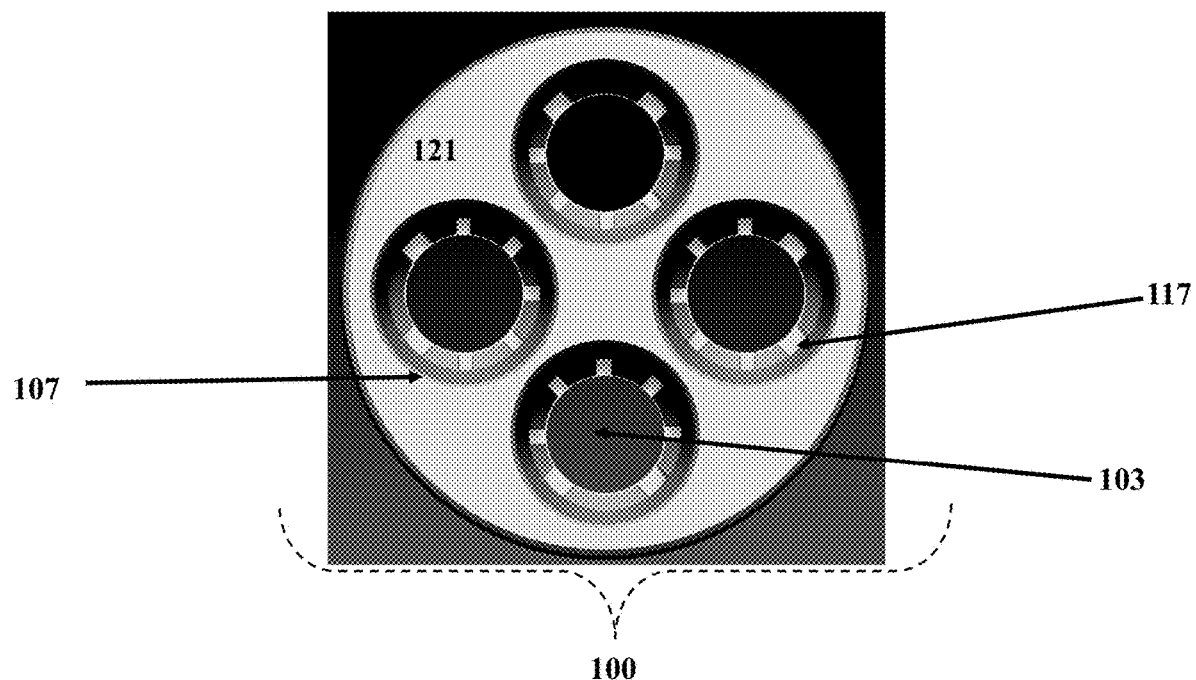
FIG. 4B is a rear view of an HFVN having a plurality of chokes and a single manifold.

FIG. 4B is a rear view of an HFVN 100 having: (a) a plurality of Chokes 103 extending from the Top Surface 102 (not shown in FIG. 4B) to the Bottom Surface 121); and (b) and a single Manifold 109 (not shown in FIG. 4B). As noted elsewhere herein, each Choke 103 includes at least one Manifold Outlet 117 which is fluidly connected to the Manifold 109. Fluid travels from the Choke inlet 105 (not shown in FIG. 4B) through the Choke 103 and exits through the Choke Outlet 107.

Figure 5:
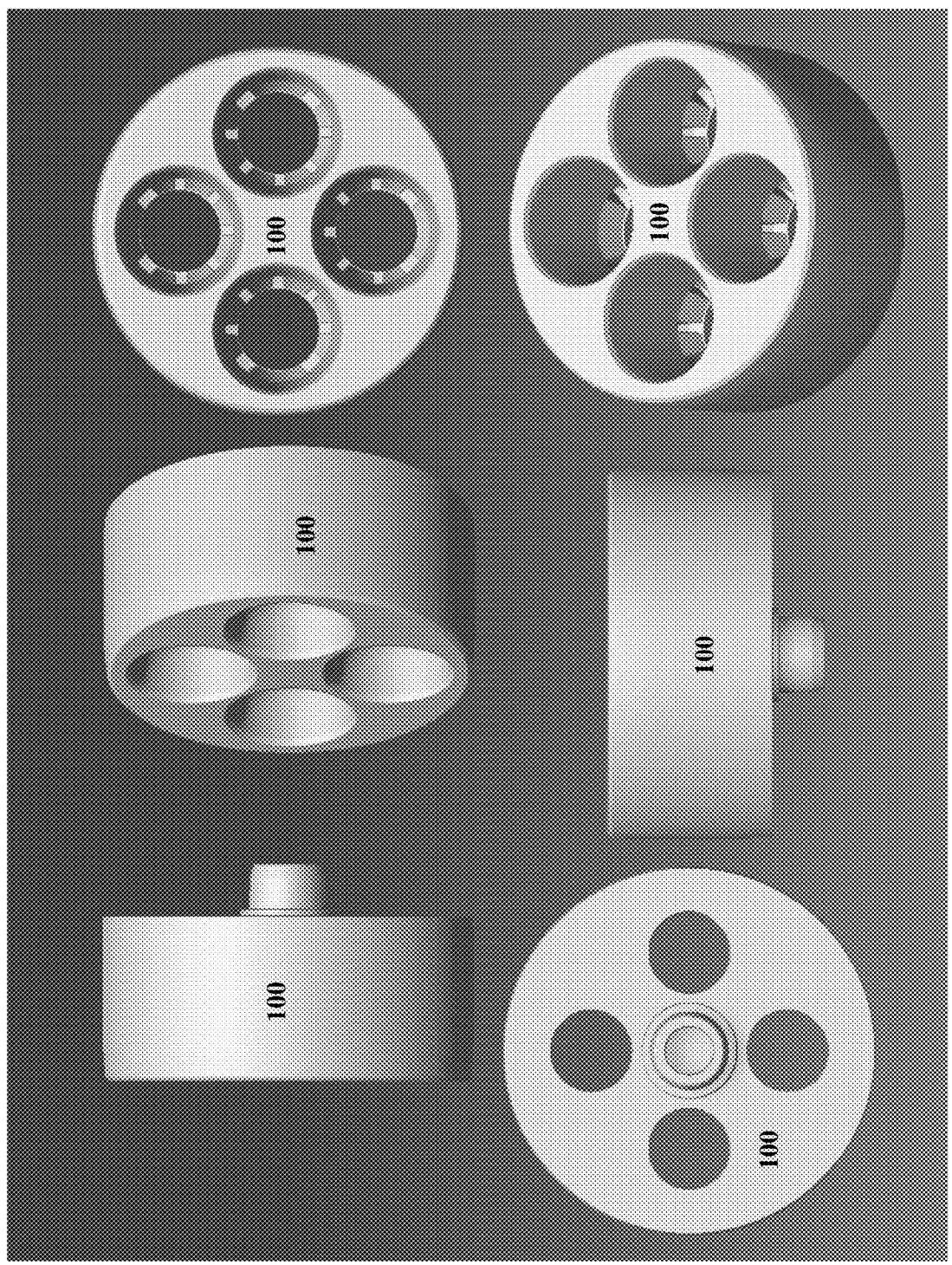
FIG. 5 is a compilation showing several views of an HFVN having a plurality of chokes and a single manifold.

FIG. 5 is a compilation showing several views of an HFVN 100 having a plurality of Chokes 103 (not labeled in FIG. 5) and a single Manifold 109 (not shown in FIG. 5).

Figure 6A:
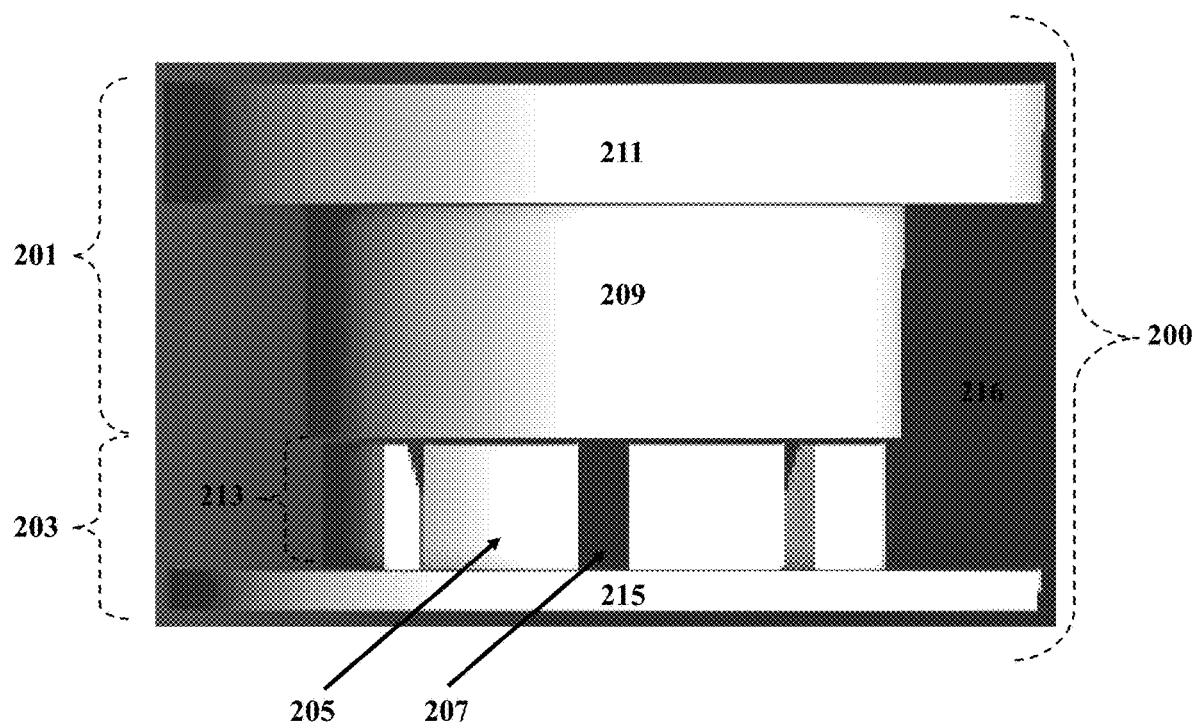
FIG. 6A is a side view of an HFVN assembly having a plurality of fins and manifold outlets.

FIG. 6A is a side view of an HFVN Assembly 201 comprising: (a) a Female Cap 201 having a Female Cap Opening 202 (not shown in FIG. 6A); and (b) a Male Cap 203 having a Male Cap Opening 204 (not shown in FIG. 6A). Said Female Cap 201 further comprises a Female Body 209 connected to a Female Flange 211 that extends radially beyond the edges of the Female Body 209. Said Male Cap 203 further comprises a Male Body 213 and a Male Flange 215 that extends radially beyond the edges of the Male Body 213. The Male Body 213 further comprises a series of Fins 205 interspaced with openings (i.e., Manifold Outlets 207). When the Female Cap 201 and the Male Cap 203 are placed together, they define the boundaries of an area of space (i.e., a Pocket 216). Thus, as shown in FIG. 6A, the Pocket 216 is in fluid communion with the Manifold Outlets 207.

FIG. 6B is a front view of a Female Cap 201 of an HFVN Assembly 200. As shown in FIG. 6B, the Female Cap Opening 202 is centrally located in the Female Flange 211 and extends through the width of both the Female Flange 211 and the Female Body 209 (not shown in FIG. 6B).

FIG. 6C is a side vide of a Female Cap 201 of an HFVN Assembly 200 having a Female Body 209 and a Female Flange 211.

FIG. 6D is a rear view of a Male Cap 203 of an HFVN Assembly 200. As shown in FIG. 6D, the Male Cap Opening 204 is centrally located in the Male Flange 215 and extends through the width of both the Male Flange 215 and the Male Body 213 (not labeled in FIG. 6D). The Male Body 213 of the Male Cap 203 comprises a plurality of Fins 205 and Manifold Outlets 207 distributed around the Male Cap Opening 204.

FIG. 6E is a side vide of a Male Cap 203 of an HFVN Assembly 200 having: (a) a Male Body 213 comprising at least one Fin 205 and at least one Manifold Outlet 207; and (b) a Male Flange 215 extending radially beyond the edges of the Male Body 213.

Figure 7A:
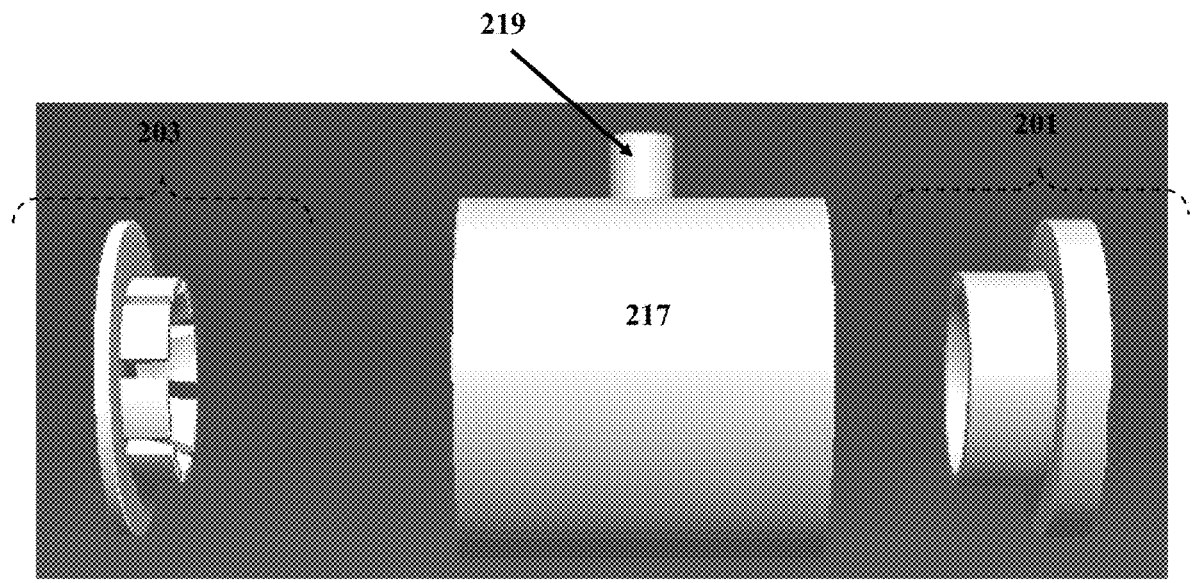
FIG. 7A is a side exploded view of an HFVN assembly and a pipe having a tee.
Figure 7B:
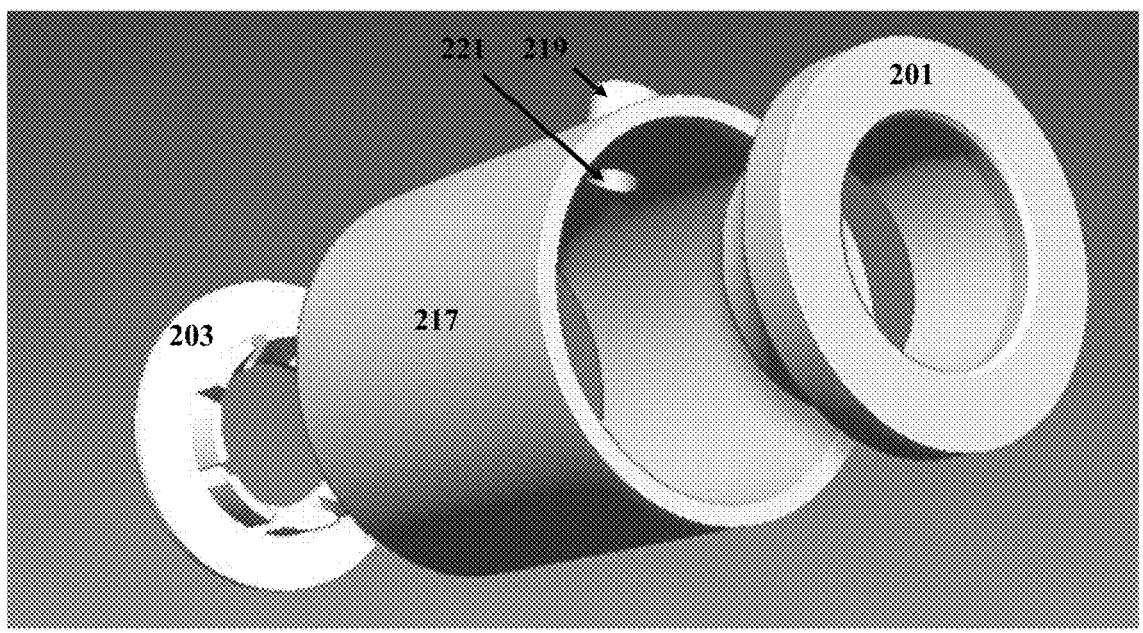
FIG. 7B is a perspective exploded view of an HFVN assembly and a pipe having a tee.

FIGS. 7A and 7B are side and perspective exploded views, respectively, of: (a) an HFVN Assembly 200 (not labeled in FIG. 7A or 7B) comprising a Female Cap 201 and a Male Cap 203 and; (b) a Pipe 217 having a Tee 219 approximately midway along the length of the Pipe 217. The HFVN Assembly 200 is dimensionally sized to securely fit telescopingly inside the Pipe 217 by a friction fit. In alternative embodiments, the HFVN Assembly 200 could be secured within the Pipe 217 by adhesive (e.g., PVC glue), sonic welding, heat welding or other permanent attachment means. The Tee 219 is hollow, i.e., having a Tee Opening 221. As shown in FIGS. 7A and 7B, the Pipe 217 having a Tee 219 is commonly referred to as a "reducing tee." As noted above, the Manifold Outlets 207 are in fluid communion with the Pocket 216. Thus, when the Female Cap 201 is affixed on one end of the Pipe 217 and the Male Cap 203 is affixed on a distal end of the Pipe 217, the Pocket 216 will be in fluid communion with the Tee Opening 221. The HFVN Assembly 200 can thus be used "in line" with piping, e.g., for use in oxygenating water as it flows through a piping system.

Figure 7C:
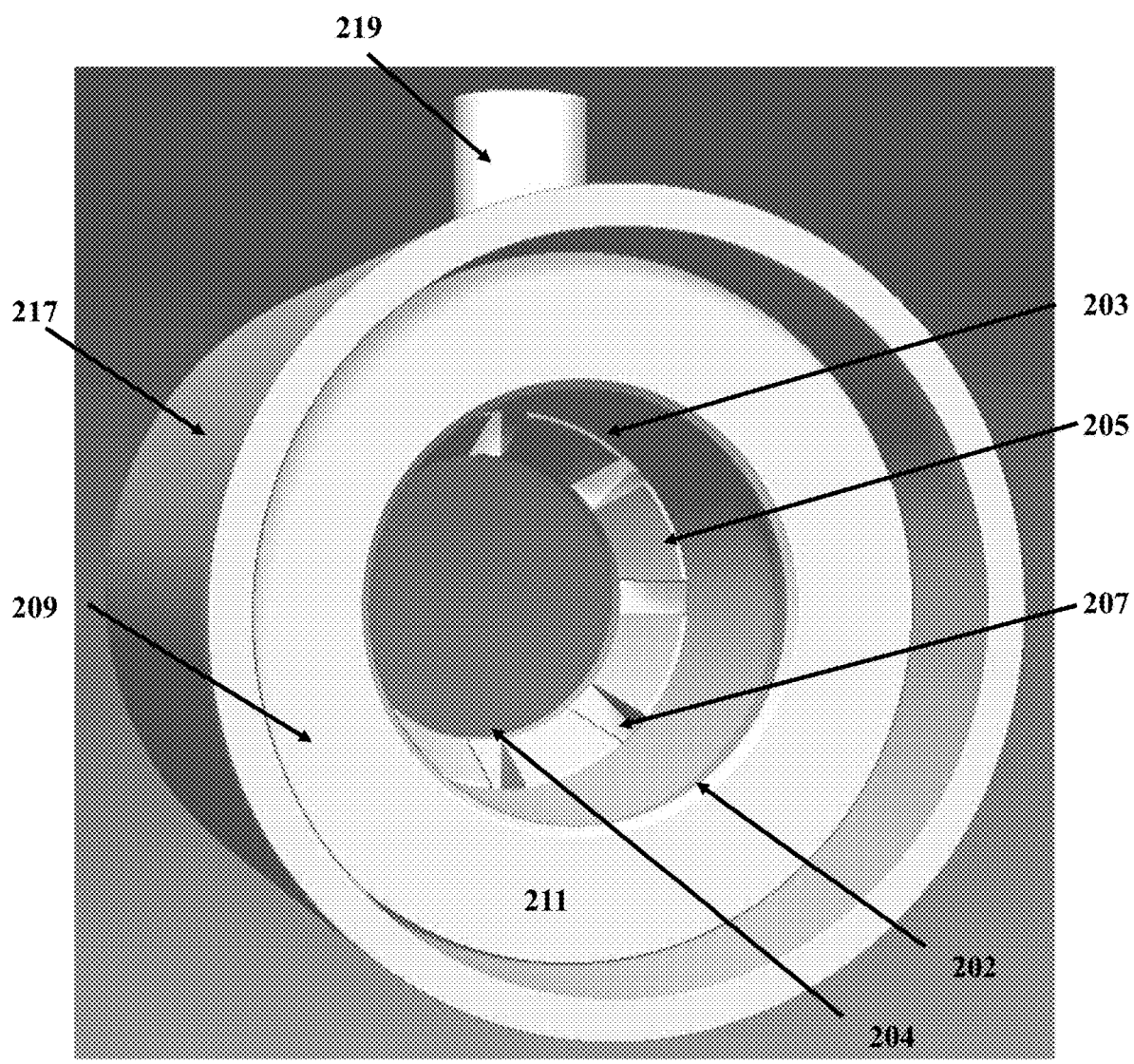
FIG. 7C is a perspective view of an HFVN assembly attached to a Pipe having a Tee.

FIG. 7C is a perspective view of an HFVN Assembly 200 attached to a Pipe 217 having a Tee 219. As shown in FIG. 7C, the Female Body 209 is shown fitted inside the Pipe 217. The Female Flange 211 is located entirely inside the Pipe 217. From the perspective view depicted in FIG. 8, the Female Flange 211 of the HFVN Assembly 200 is visible inside of the Pipe 217. Here, the Tee 219 may be connected to a gas supply (e.g., air) and a liquid (e.g., water) passed through the Pipe 217 (and, thus, through the HFVN Assembly 200 through both the Female Cap Opening 202 and the Male Cap Opening 204 which, collectively, form a sort of "choke"). As liquid flows through the HFVN Assembly 200 and the Pipe 217, the Manifold Outlets 117 create a Venturi effect as liquid (e.g., water) flows past the gas (which, in turn, flowed from the Tee Opening 221 into the Pocket 216 and into the Manifold Outlets 207). This embodiment comprises a significant improvement over prior Venturi systems inasmuch as it allows for a relatively high liquid flow rate through the Pipe 217. The perspective view shown in FIG. 7C also illustrates the plurality of Fins 205 and Manifold Outlets 207 present in the Male Cap 203. In particular, the perspective view shown in FIG. 7C shows the pitch or angle associated with the Fins 205 and the Manifold Outlets 207.

Figure 8A:
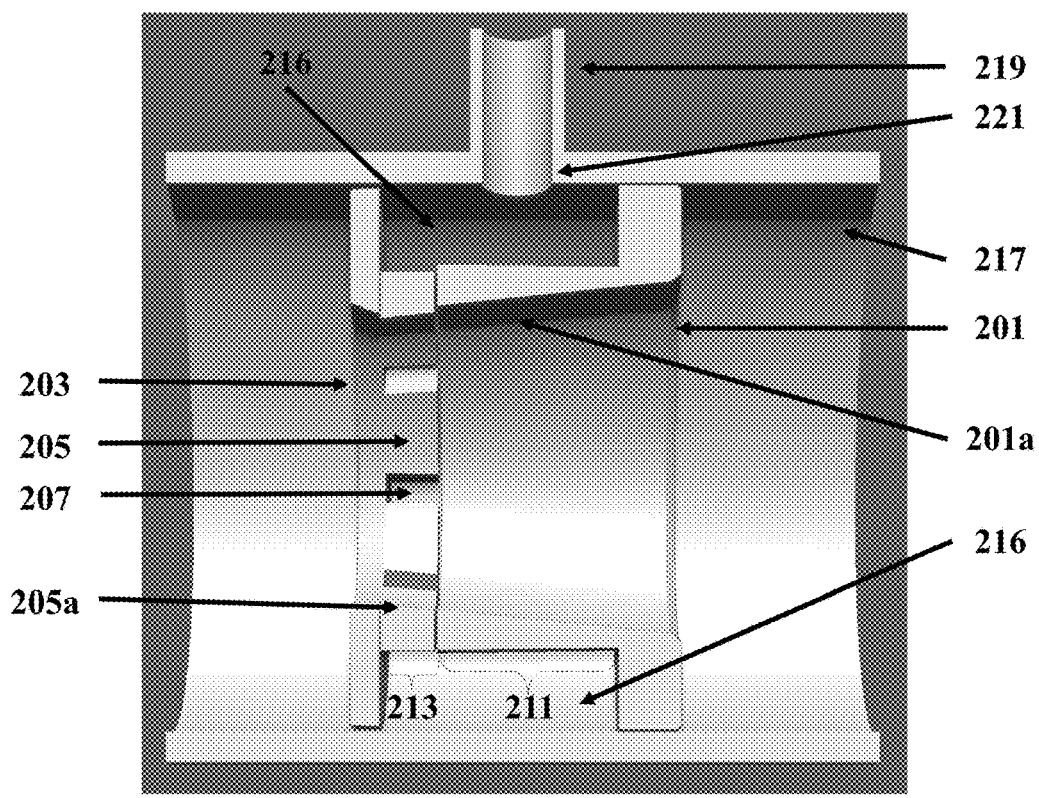
FIG. 8A is a side cutaway view of an HFVN assembly (comprising a female cap and a male cap).

FIG. 8A is a side cutaway view of an HFVN Assembly 200 (comprising a Female Cap 201 and a Male Cap 203) attached to a Pipe 217 having a Tee 219. This is a side cutaway view of the same HFVN Assembly 200 and Pipe 217 shown in FIGS. 7A through 7C above. As shown in FIG. 8A, the HFVN Assembly 200 is fully fitted into the Pipe 217 in such a way that the Tee 219 and the Tee Opening 221 are located in-between the Female Flange 211 and the Male Flange 215. This space forms a Pocket 216 defined by the Female Flange 211, the Female Body 209, the Male Body 213 and the Male Flange 215 In the configuration shown in FIG. 8A, the Pocket 216 is in the general shape of a hollow cylindrical segment but could be generally toroidal in other configurations. Thus, there is a fluid connection between the Pocket 216 and the Tee Opening 221 which allows a gas (e.g., air) to be supplied to the Tee 219 and flow into the Pocket 216.

The Male Cap 203 has a plurality of Fins 204 and Manifold Outlets 207. These Fins 204 have a Fin Pitch 205$a$. Each Manifold Outlet 207 is also in fluid communion with the Pocket 216. This allows a liquid (e.g., water) to be passed through the HFVN Assembly 200 while a gas (e.g., air) supplied to the Tee 219, to flow into the Pocket 216 and through each Manifold Outlet 207 where a Venturi effect occurs—thereby causing cavitation of the gas into small bubbles in the liquid—allowing for more ready diffusion of the gas into the liquid.

Figure 8B:
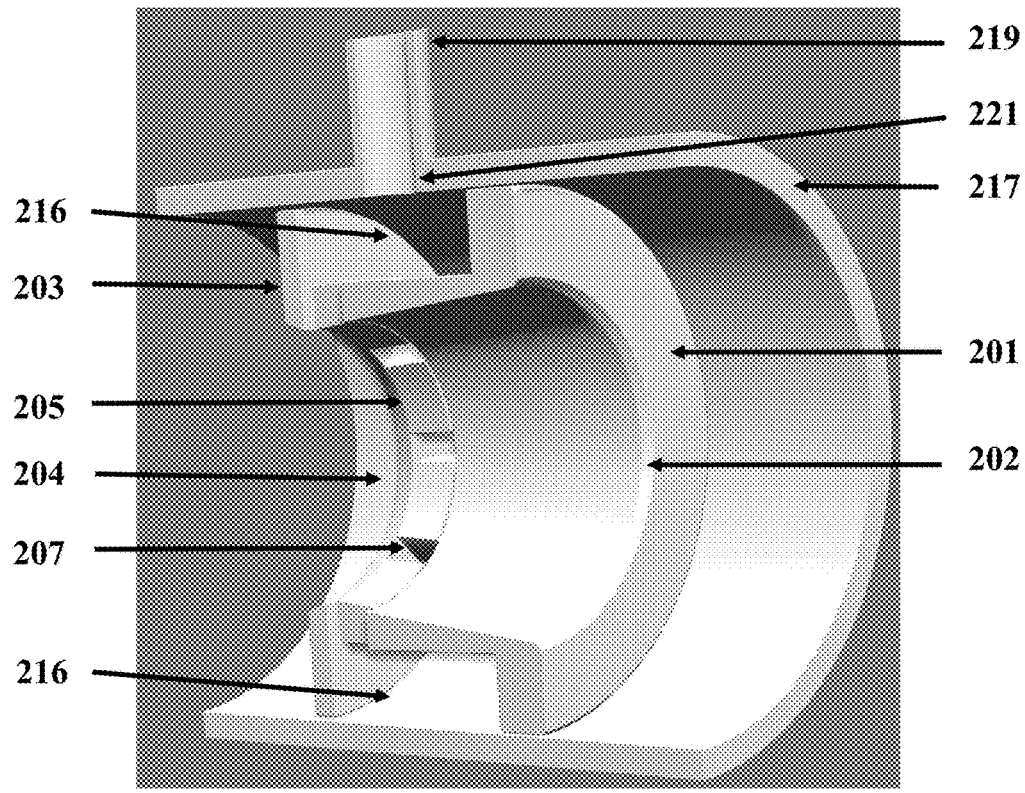
FIG. 8B is a perspective cutaway view of an HFVN assembly (comprising a female cap and a male cap).

FIG. 8B is a perspective cutaway view of an HFVN Assembly 200 (comprising a Female Cap 201 and a Male Cap 203) attached to a Pipe 217 having a Tee 219. This is a perspective cutaway view of the same HFVN Assembly 200 and Pipe 217 shown in FIG. 8A above (and, thus, also the same as shown in FIGS. 7A through 7C above). As shown in FIG. 8B, the Pocket 216 is in fluid communion with the Tee Opening 221. This allows a gas (e.g., air) to be introduced into the Tee 219 via the Tee Opening 221 which will then flow into the Pocket 216 and out of the plurality of Manifold Outlets 207 defined as the space in-between two adjacent Fins 205. Thus, as a liquid (e.g., water) flows through a first end of the Pipe 217, through the Female Cap Opening 202, through the Male Cap Opening 204 and through a second end of the Pipe 217, it will come in contact with a gas (e.g., air) introduced into the Tee 219 which gas will flow from the Tee Opening 221, through the Pocket 216 and out of the Manifold Outlets 207.

Figure 9A:
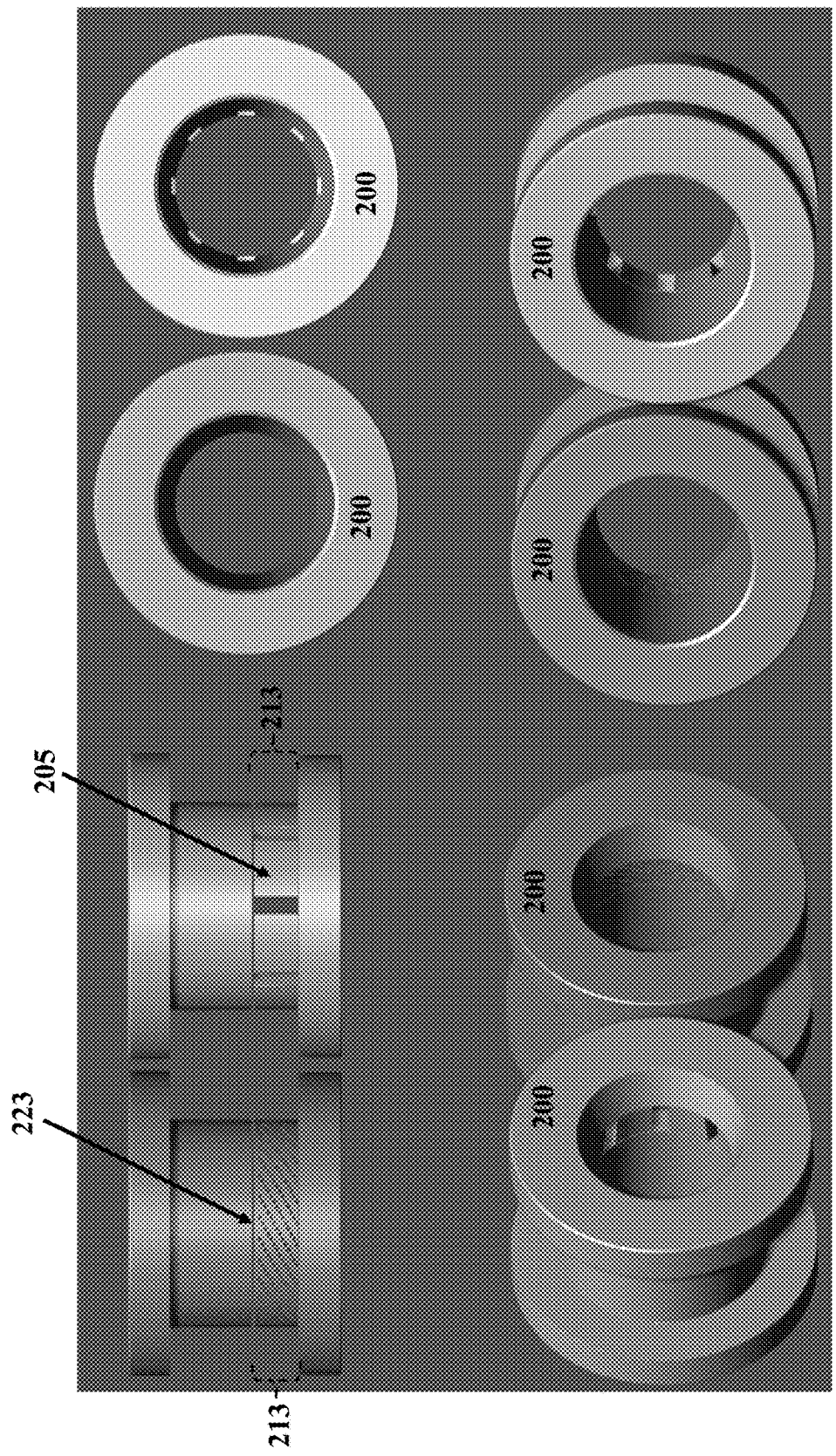
FIG. 9A is a compilation showing several different views of two embodiments of HFVN assemblies.

FIG. 9A is a compilation showing several different views of two embodiments of HFVN Assemblies 200, namely: (a) a first embodiment having a plurality of Fins 205 in the Male Body 213 (i.e., the same HFVN Assembly 200 noted in FIGS. 6A through 8B above); and (b) a second embodiment having a plurality of Pinhole Manifold Outlets 223 in the Male Body 213. These Pinhole Manifold Outlets 223 are relatively small and act as miniature Venturis as water or some other fluid passes through the HFVN Assembly 200. A variety of front, back and perspective views of these two HFVN Assembly 200 embodiments are shown in FIG. 9.

Figure 9B:
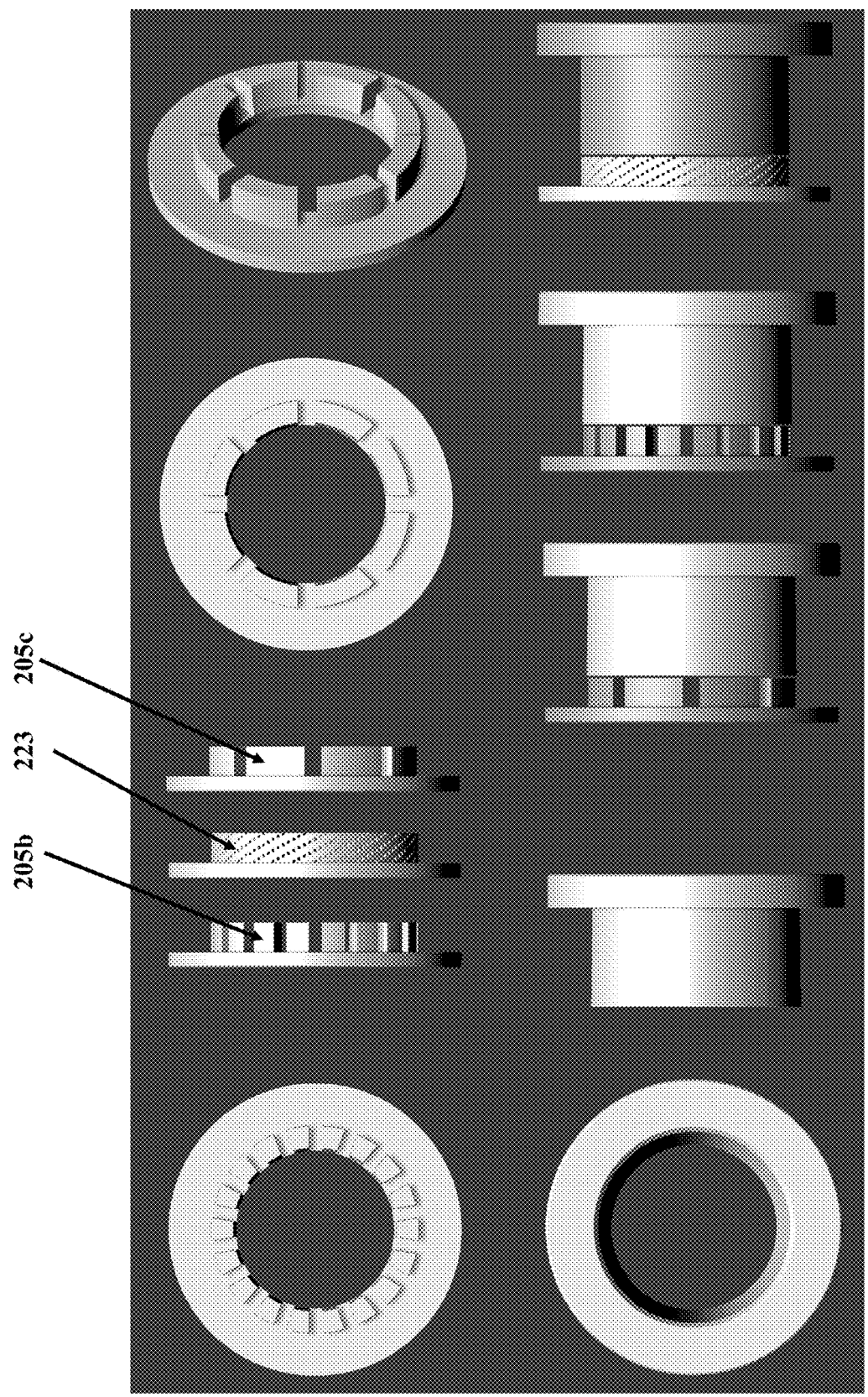
FIG. 9B is a compilation showing several different views of three embodiments of HFVN assemblies.

FIG. 9B is a compilation showing several different views of three embodiments of HFVN Assemblies 200, namely: (a) a first embodiment having a plurality of small Fins 205b in the Male Body 213; (b) a second embodiment having a plurality of Pinhole Manifold Outlets 223 in the Male Body 213; and (c) a third embodiment having a plurality of Large Fins 205c in the Male Body 213. In one embodiment, the HFVN Assembly 200 may be manufactured through the use of three-dimensional printing ("3D Printing"). In particular, the manufacture of the Pinhole Manifold Outlets 223 in a Male Body 213 are ideal candidates for 3D Printing given the small side of the Pinhole Manifold Outlets 223.

Figure 10A:
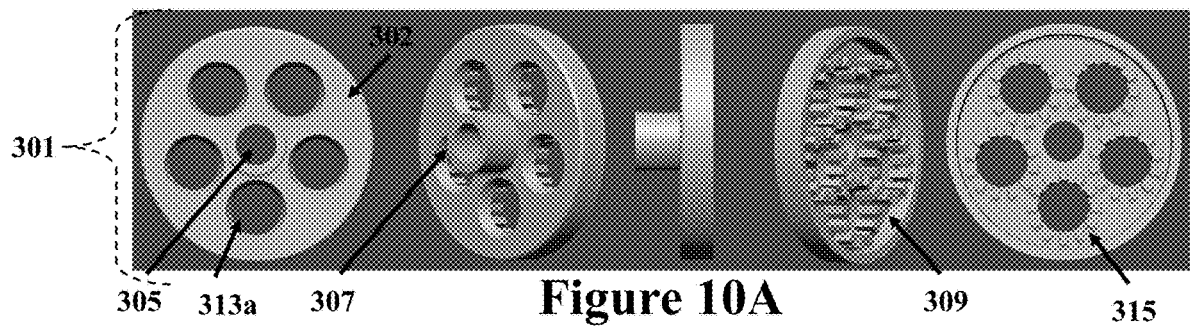
FIG. 10A is a compilation of different front, side and perspective views of a top piece of a two-piece HFVN.

FIG. 10A is a compilation of different front, side and perspective views of a Top Piece 301 of a Two-Piece HFVN 300 (not labeled in FIG. 10A). The Top Piece 301 has a Top Surface 302 and includes a Manifold 305 and a Manifold Nipple 307 protruding outward from the Top Surface 302. This Manifold 305 is in fluid communion with a hollow Top Chamber 309 located on a reverse side of the Top Piece 301 distal from the Manifold Nipple 307. The Top Piece 301 further includes at least one Top Choke 313a. In the embodiment shown in FIG. 10A, the Top Piece 301 includes a plurality of Top Chokes 313a. Each Top Choke 313a is an orifice which extends through the width of the Top Piece 301 and into the Top Chamber 309. At least one Manifold Outlet 315 is formed into the reverse side of the Top Piece 301 distal from the Manifold Nipple 307. Each Manifold Outlet 315 is connected to a Top Choke 313b.

Figure 10B:
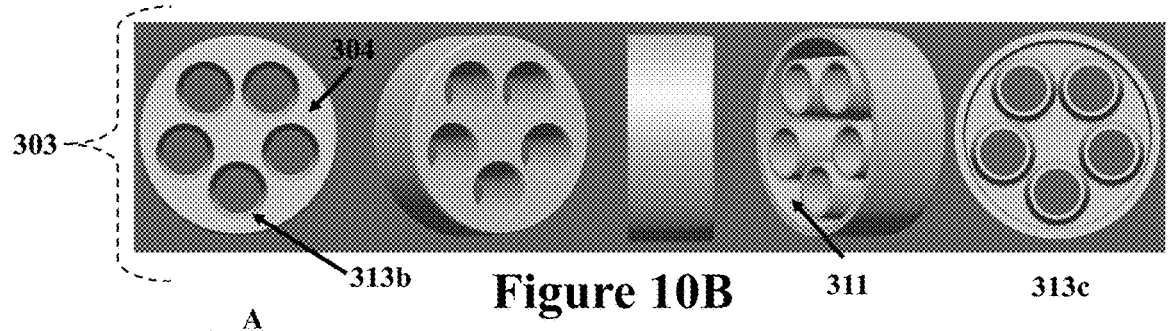
FIG. 10B is a compilation of different front, side and perspective views of a bottom piece of a two-piece HFVN.

FIG. 10B is a compilation of different front, side and perspective views of a Bottom Piece 303 of a Two-Piece HFVN 300 (not labeled in FIG. 10B). As shown in FIG. 10B, the Bottom Piece 303 has a Bottom Surface 304 and includes a hollow Bottom Chamber 311. The Bottom Piece 303 also includes at least one Bottom Choke 313b. In the embodiment shown in FIG. 10B, the Bottom Piece 303 includes a plurality of Chokes 313b. Each Bottom Choke 313b is an orifice which extends through the width of the Bottom Piece 303 beyond the Bottom Chamber 311.

Figure 10C:
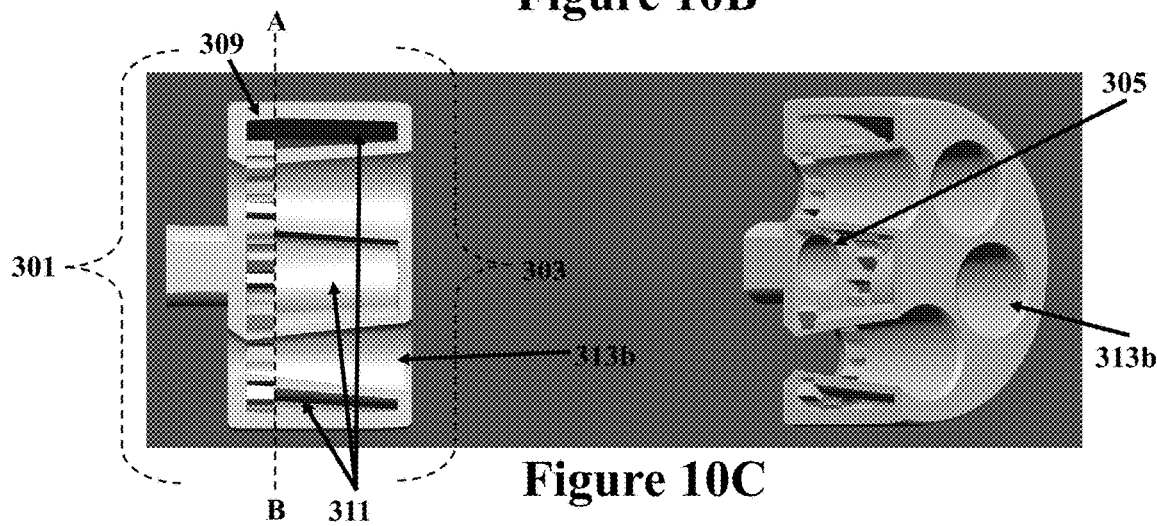
FIG. 10C is a compilation of a side and perspective cutaway view of a two-piece HFVN.

FIG. 10C is a compilation of a side and perspective cutaway view of a Two-Piece HFVN 300 (not labeled in FIG. 10C) comprising: (a) a Top Piece 301; and (b) a Bottom Piece 303. As shown in FIG. 10C, the Top Piece 301 (shown to the left of line $\overline{AB}$) and the Bottom Piece 303 (shown to the right of line $\overline{AB}$) detachably join together to form a single Two-Piece HFVN 300. The Top Piece 301 and the Bottom Piece 303 may be permanently joined together by attachment means such as adhesive, PVC cement, ultrasonic welding, welding or brazing depending on the material from which they are constructed. In one embodiment, the Top Piece 301 and the Bottom Piece 303 may be constructed out of plastic using 3D printing technology. As shown in FIG. 10C, the Top Chamber 309 of the Top Piece 301 and the Bottom Chamber 311 of the Bottom Piece 303 are dimensionally sized such that the Top Chamber 309 and the Bottom Chamber 311 are in fluid communion and form a unified compartment when the Top Piece 301 and the Bottom Piece 303 are joined together. The Manifold 305 of the Top Piece 301 is, thus, also in fluid communion with the unified compartment comprised of the Top Chamber 309 and the Bottom Chamber 311. As further shown in FIG. 10C, each Top Choke 313a is aligned with a corresponding Bottom Choke 313b, such that a Top Choke 313a and a Bottom Choke 313b join together to form a unified choke. When a gas (e.g., air or oxygen) is fed into the Manifold 305 and a fluid (e.g., water) passes through the unified choke (comprised of the Top Choke 313a and a Bottom Choke 313b), a Venturi effect occurs within the unified choke at each Manifold Outlet 315. Given the layout and relative size of the unified chokes and compared to the body of the Two-Piece HFVN 300, the apparatus shown in FIGS. 10A-10D has the ability to handle a high flow rate of fluid through the chokes while maintaining a high rate of gas diffusion through the Manifold 305 and into the fluid from the Manifold Outlets 315.

Figure 10D:
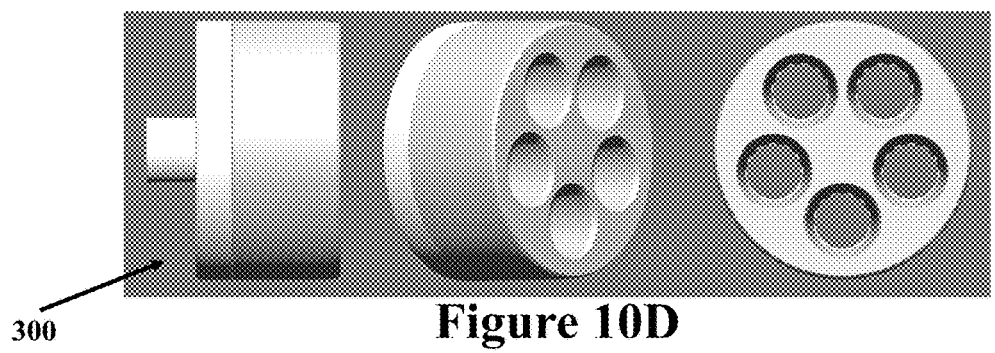
FIG. 10D is a compilation of different side, perspective and rear views of an assembled two-piece HFVN.

FIG. 10D is a compilation of different side, perspective and rear views of an assembled Two-Piece HFVN 300 showing how the exterior of the Two-Piece HFVN 300 appears when the Top Piece 301 and the Bottom Piece 303 are joined together.

It is to be understood that while a preferred embodiment of the invention is illustrated, it is not to be limited to the specific form or arrangement of parts herein described and shown. It was be apparent to those skilled in the art that various changes may be made without departing from the scope of the invention and the invention is not to be considered limited to what is shown and described in the specification and drawings.

Having thus described my invention, I claim:

1. A High Flow Venturi Nozzle assembly comprising:
   (a) a female cap having:
      (i) a female body;
      (ii) a female flange; and
      (iii) a female cap opening extending through the female flange and through the female body;
   (b) a male cap having:
      (i) a male body;
      (ii) a male flange;
      (iii) a male cap opening extending through the male flange and through the male body; and
      (iv) at least one orifice in the male body, the at least one orifice comprising a plurality of pinhole manifold outlets; and
   (c) a pocket defined by the female cap and the male cap when the female cap and the male cap are joined together; said pocket in fluid communication with said orifice to facilitate a venturi effect.

2. The High Flow Venturi Nozzle assembly of claim 1 further comprising:
   the at least one orifice comprising a plurality of manifold outlets; the male body comprising a plurality of fins each having a fin pitch.

3. The High Flow Venturi Nozzle assembly of claim 1 further comprising:
   the High Flow Venturi Nozzle assembly dimensionally sized to telescopingly fit inside a pipe; the pipe having a tee with a tee opening which is in fluid communication with the pocket.

4. The High Flow Venturi Nozzle assembly of claim 1 further comprising:
   the at least one orifice comprising a plurality of small fins each having a fin pitch.

5. The High Flow Venturi Nozzle assembly of claim 1 further comprising:
   the at least one orifice comprising a plurality of large fins each having a fin pitch.

6. The High Flow Venturi Nozzle assembly of claim 1 further comprising:
   the plurality of pinhole manifold outlets arranged in a helical distribution.

7. A High Flow Venturi Nozzle assembly comprising:
(a) a female cap having:
   (i) a female body;
   (ii) a female flange; and
   (iii) a female cap opening extending through the female flange and through the female body;
(b) a male cap having:
   (i) a male body;
   (ii) a male flange;
   (iii) a male cap opening extending through the male flange and through the male body; and
   (iv) at least one orifice in the male body comprising a plurality of pinhole manifold outlets; and
(c) a pocket defined by the female cap and the male cap when the female cap and the male cap are joined together.

8. The High Flow Venturi Nozzle assembly of claim 7 further comprising:
the plurality of pinhole manifold outlets arranged in a helical distribution.

* * * * *